(12) United States Patent
Fujii et al.

(10) Patent No.: US 8,128,980 B2
(45) Date of Patent: Mar. 6, 2012

(54) METHOD FOR PRODUCTION OF WATER-SOLUBLE POLYSACCHARIDE

(75) Inventors: Nanae Fujii, Tsukubamirai (JP); Junko Tobe, Tsukubamirai (JP); Akihiro Nakamura, Tsukubamirai (JP); Ryuji Yoshida, Izumisano (JP)

(73) Assignee: Fuji Oil Company, Limited, Osaka (JP)

( * ) Notice: Subject to any disclaimer, the term of this patent is extended or adjusted under 35 U.S.C. 154(b) by 112 days.

(21) Appl. No.: 12/451,900

(22) PCT Filed: May 28, 2008

(86) PCT No.: PCT/JP2008/059773
§ 371 (c)(1),
(2), (4) Date: Dec. 4, 2009

(87) PCT Pub. No.: WO2008/149738
PCT Pub. Date: Dec. 11, 2008

(65) Prior Publication Data
US 2010/0136204 A1 Jun. 3, 2010

(30) Foreign Application Priority Data
Jun. 6, 2007 (JP) ................... 2007-150724

(51) Int. Cl.
*A23L 1/20* (2006.01)
(52) U.S. Cl. ............ 426/634; 536/123; 424/757
(58) Field of Classification Search .......... 426/634
See application file for complete search history.

(56) References Cited

U.S. PATENT DOCUMENTS

| | | | |
|---|---|---|---|
| 5,587,197 A | 12/1996 | Maeda et al. | |
| 5,968,794 A * | 10/1999 | Samain et al. | ............... 435/178 |
| 6,004,616 A | 12/1999 | Maeda et al. | |
| 6,280,526 B1 | 8/2001 | Maeda et al. | |
| 6,569,473 B2 | 5/2003 | Maeda et al. | |
| 7,229,658 B1 | 6/2007 | Inoue et al. | |

FOREIGN PATENT DOCUMENTS

| | | |
|---|---|---|
| JP | 61-40302 | 2/1986 |
| JP | 5-230101 | 9/1993 |
| JP | 6-256402 | 9/1994 |
| JP | 2599477 | 1/1997 |
| JP | 11-240902 | 9/1999 |
| JP | 2000-279104 | 10/2000 |
| JP | 3280768 | 2/2002 |

OTHER PUBLICATIONS

International Search Report issued Jul. 15, 2008 in International (PCT) Application No. PCT/JP2008/059773.
J. Liu et al., "Addition of Pectin and Soy Soluble Polysaccharide Affects the Particle Size Distribution of Casein Suspensions Prepared from Acidified Skim Milk", J. Agric. Food Chem., vol. 54, No. 17, pp. 6241-6246, 2006.

* cited by examiner

*Primary Examiner* — Elizabeth Gwartney
(74) *Attorney, Agent, or Firm* — Wenderoth, Lind & Ponack, L.L.P.

(57) ABSTRACT

Disclosed is a novel water-soluble soybean polysaccharide which is produced by imparting a function of stabilizing a protein in a pH range around the isoelectric point of the protein to a water-soluble soybean polysaccharide. Also disclosed is a novel dispersion stabilizer which enables to stabilize the dispersion of a protein in a pH range around the isoelectric point of the protein. Further, disclosed is a acidic protein food/beverage comprising the dispersion stabilizer. A crosslinked product of a water-soluble soybean polysaccharide extracted from a soybean seed raw material can improve the dispersion stability of a milk protein in a pH range around the isoelectric point of the protein. By using the water-soluble soybean polysaccharide, an acidic protein food/beverage having a low viscosity can be produced.

12 Claims, 2 Drawing Sheets

US 8,128,980 B2

METHOD FOR PRODUCTION OF WATER-SOLUBLE POLYSACCHARIDE

This application is a U.S. national stage of International Application No. PCT/JP2008/059773 filed May 28, 2008.

TECHNICAL FIELD

The present invention relates to a method for producing a novel water-soluble soybean polysaccharide which enables to stabilize a protein that has not been sufficiently stabilized with the conventional water-soluble soybean polysaccharide, in a pH range around the isoelectric point of the protein, and also relates to a novel dispersion stabilizer for a protein, containing the produced polysaccharide as an active ingredient.

BACKGROUND ART

In Japan, okara (bean curd refuse) is by-produced about 0.8 million tons per year, but most of them are used for feed or fertilizer with low added-value. As one of the methods to make good use of such okara, extraction of various materials having high functionalities from okara has been tried. For example, Patent Document 1 describes that a water-soluble soybean polysaccharide is obtained by degrading water-insoluble vegetable fibers containing a protein under acidic conditions around the isoelectric point of the protein at a high temperature.

Although aggregation and precipitation of a milk protein usually occur at a pH of 5.0 or less, addition of this water-soluble soybean polysaccharide enables to stabilize the dispersion of a protein even under an acidic pH from 3.8 to 4.2, and thus to produce an acidic milk beverage having a low viscosity (Patent Document 2). However, these water-soluble soybean polysaccharides produced by the conventional method have not shown an ability enough to stably disperse a protein, for example, in a pH range around the isoelectric point of a milk protein or at a pH exceeding such isoelectric point, i.e. at a pH of 4.2 or more.

Meanwhile, pectin and carboxymethylcellulose other than water-soluble soybean polysaccharides have been used as a dispersion stabilizer for a protein under acidic conditions. When these substances are used as a stabilizer for acidic milk beverages, a milk protein can be dispersed and stabilized in a pH range around the isoelectric point of a milk protein, i.e. in a pH range of about 4.2 to 4.8, which is a pH range such that stabilization with the water-soluble soybean polysaccharides is difficult, but the beverage produced have viscous or pasty mouth feel. It is difficult to obtain a beverage having a low viscosity in a pH range around the isoelectric point of the milk protein.

A milk protein has a positive charge under acidic conditions at or below the isoelectric point. Studies on the model of dispersing protein in acidic milk beverages using polysaccharides, particularly pectin and a water-soluble soybean polysaccharide, has been advanced (Non-Patent Document 1). It is thought that aggregation and precipitation of proteins are suppressed due to electric repulsion and steric hindrance by ionic and hydrophobic bonding to the protein surface via own negative charges of polysaccharides which distribute to dispersion stability of a milk protein. In order to improve dispersion stability of polysaccharides, a lot of approaches to increasing the negative charges of the polysaccharides have been made so far. For example, carboxymethylcellulose as mentioned above is increased negative charges by introducing carboxymethyl group into cellulose. However, a stabilizer which enables to stabilize the dispersion of a milk protein at a low viscosity in a pH range around the isoelectric point of the milk protein has not been obtained yet. Moreover, with respect to the dispersion stability of a protein, investigation focused on the molecular mass of stabilizers has not been known so far.

Patent Document 1: JP 2599477 B
Patent Document 2: JP 3280768 B
Non-Patent Document 1: J. Agric. Food Chem., 54(17), 6241-6246, 2006

DISCLOSURE OF THE INVENTION

Problems to be Solved by the Invention

An object of the present invention is to provide a novel water-soluble soybean polysaccharide which is produced by imparting a function of stabilizing a protein in a pH range around the isoelectric point of the protein to a water-soluble soybean polysaccharide. Another object of the present invention is to provide a novel dispersion stabilizer which enables to stabilize the dispersion of a protein in a pH range around the isoelectric point of the protein, and acidic protein food and beverage using the dispersion stabilizer.

Means for Solving the Problems

As a result of having studied intensively on the above problems, the present inventors have discovered that a molecular mass of a polysaccharide to be added contributes much to dispersion stability of a protein in a pH range around the isoelectric point. The present invention has been completed based on the finding that a water-soluble polysaccharide which has been obtained by crosslinking water-soluble soybean polysaccharide can stabilize a protein in a pH range around the isoelectric point of the milk protein, while such stabilization could not be attained by the conventional water-soluble soybean polysaccharides.

That is, the present invention is:

(1) A method for producing a water-soluble polysaccharide, which comprises carrying out a crosslinking treatment of a water-soluble soybean polysaccharide.

(2) The method for producing a water-soluble polysaccharide according to (1), wherein the crosslinking treatment is carried out using a phosphoric acid compound or a salt thereof as a crosslinking agent.

(3) The method for producing a water-soluble polysaccharide according to (2), wherein the crosslinking treatment is carried out by adding a phosphoric acid compound to an aqueous solution of a water-soluble soybean polysaccharide, followed by a heating treatment under alkali conditions.

(4) A dispersion stabilizer for a protein comprising a crosslinked water-soluble soybean polysaccharide as an active ingredient.

(5) An acidic protein food or beverage comprising the dispersion stabilizer according to (4).

(6) A crosslinked water-soluble soybean polysaccharide comprising a phosphoric acid diester bond in the molecule.

Effect of the Invention

According to the present invention, a novel water-soluble soybean polysaccharide having a high molecular mass different from the conventional can be obtained, and novel acidic protein beverage and food can be provided by using the water-soluble soybean polysaccharide which enables to stabilize the dispersion of a protein which has not hitherto been able to be stabilized, in a pH range of the isoelectric point of the protein.

BEST MODE FOR CARRYING OUT THE INVENTION (Water-Soluble Soybean Polysaccharides)

Hereinafter, the present invention will be concretely explained. The water-soluble soybean polysaccharide used in the present invention includes water-soluble soybean polysaccharides obtained by various methods, and, for example, water-soluble soybean polysaccharides as described in Patent Document 1 can be used. As an example of production, a water-soluble soybean polysaccharide can be obtained by extracting a raw material such as defatted soybean cake (soymeal) and okara which is by-product in the production of tofu, soy milk or soy protein isolate, under aqueous conditions at a high temperature under a weakly acidic conditions of the isoelectric point of the protein, and subjecting the extract to solid-liquid separation. Okara with less oil and less protein content obtained in the production of soy protein isolate is a preferable raw material, and an extraction temperature exceeding 100° C. is preferred because of high extraction efficiency. The water-soluble soybean polysaccharide obtained in this manner may be subjected to crosslinking reaction of the extraction filtrate or purified extraction filtrate, or may be subjected to crosslinking reaction of a further dried product from the extraction filtrate or its purified product.

(Crosslinking Reaction)

These water-soluble soybean polysaccharides are subjected to a crosslinking treatment. The crosslinking treatment enables to directly form an intramolecular or intermolecular crosslinkage of water-soluble soybean polysaccharides, or may construct a crosslinkage via a crosslinking agent. As an example of a direct intermolecular crosslinking method for polysaccharides, it is carried out by adding an aqueous solution of various acids including a mineral acid such as hydrochloric acid to a water-soluble soybean polysaccharide at a rate of 2 to 50 mmol per 100 g of the polysaccharide, adjusting the water content to 0.5 to 20%, and then heating the mixture at 100° C. to 160° C. In addition, such a crosslinking reaction may be carried out by treating a water-soluble soybean polysaccharide with an enzyme or a radiation.

A method for crosslinking a water-soluble polysaccharide via a crosslinking agent is concretely exemplified. A variety of crosslinking agents are added to an aqueous solution of a water-soluble soybean polysaccharide. The crosslinking agent herein mentioned includes, but not particularly limited to, phosphoric acid compounds (e.g. phosphoric acid, phytic acid, polyphosphoric acid, metaphosphoric acid, phosphoric anhydride, hexametaphosphoric acid, trimetaphosphoric acid, etc.) and salts thereof, phosphorus oxychloride, epichlorohydrin, formaldehyde, glutaraldehyde, diepoxyalkane and diepoxyalkene, and the like. Among them, when they are used for foods, a phosphoric acid compound or its salt is preferable in view of the reaction efficiency, and especially, trimetaphosphoric acid or its salt is most preferable. The amount of the crosslinking agent to be added differs depending on the kind of the crosslinking agents and the concentration of the water-soluble soybean polysaccharides, but in the case where trimetaphosphoric acid is used for a 5% by weight aqueous solution of a water-soluble soybean polysaccharide, the amount of trimetaphosphoric acid is preferably 1% by weight or more to 100% by weight or less, more preferably 10% by weight or more to 80% by weight or less, and most preferably 20% by weight or more to 50% by weight or less. If the amount of the crosslinking agent is too little, the efficiency of the crosslinking formation becomes low, and if the amount of the crosslinking agent is too large, viscosity of the solution suddenly increases, and gelation occurs sometimes during the treatment. It is necessary to adjust the concentration of the crosslinking agent to be added according to the concentration of the water-soluble soybean polysaccharide in a reaction solution, and when the concentration of the water-soluble soybean polysaccharide is high, the amount of the crosslinking agent to be added can be less than the above-described value. In addition, when the concentration of the water-soluble soybean polysaccharide in the reaction solution is low, reactivity becomes low, and when the concentration of the water-soluble soybean polysaccharide in the reaction solution is high, viscosity increase is accompanied with and resulting in deterioration of handling characteristics, therefore, 0.1 to 20% by weight of the crosslinking agent is desirable. Moreover, when the crosslinking reaction is carried out, salts can be added so as to adjust the viscosity of the soybean polysaccharide at the time of the reaction. Such salts are soluble in water and preferred examples thereof include sodium chloride, calcium chloride, sodium sulphate, and sodium carbonate.

When phosphoric acid or a salt thereof is used as a crosslinking agent, an efficient crosslinking reaction can be carried out by heating an aqueous solution after the addition of such a crosslinking agent, under alkali conditions. In order to enhance a function for stabilizing the dispersion of a protein, the alkali condition is preferably pH 10 or more, more preferably pH 12 or more, and preferably less than pH 14, more preferably less than pH 13. In addition, the heating condition is preferably 40° C. or higher, more preferably 50° C. or higher, most preferably 55° C. or higher, and preferably 90° C. or lower, more preferably 80° C. or lower. The heating time is preferably 10 minutes or longer, more preferably 30 minutes or longer, and preferably not more than 4 hours, more preferably not more than 2 hours. When the heating pH and heating temperature are high, the water-soluble soybean polysaccharide is sometimes degraded by β-elimination, and when the heating pH and heating temperature are low, crosslinking reactivity is poor. By this procedure, crosslinkage formation takes place in the water-soluble soybean polysaccharides, thereby producing a high molecular fraction and enabling to enhance an ability to stabilize the dispersion of a protein. In addition, by this treatment, it is possible to simultaneously carry out a crosslinking reaction and deesterification of methyl esterified galacturonic acid, whereby to enable to further enhance a dispersion stabilizing ability for a protein. After these reactions, the resulting insolubles are removed to obtain a water-soluble fraction only.

The water-soluble soybean polysaccharides obtained by using a phosphoric acid compound or its salt as a crosslinking agent contains a phosphoric acid diester bond in the molecule and is a water-soluble soybean polysaccharide which is polymerized by phosphoric acid diester bonds, as confirmed in Example 3 described later.

(Hetero Crosslinking Reaction)

Other than the method for crosslinking intermolecularly a water-soluble soybean polysaccharide directly or via a crosslinking agent as mentioned above, it is also possible to crosslink a water-soluble soybean polysaccharide and other polymer material, and the crosslinked water-soluble soybean polysaccharide of the present invention also includes such a product. The polymer material includes, but not particularly limited to, polysaccharides (e.g. starch, modified starch, dextrin, cellulose, microcrystalline cellulose, fermented cellulose, various modified celluloses, agar, carrageenan, furcellaran, guar gum, locust bean gum, tamarind seed polysaccharides, tara gum, gum arabic, tragacanth gum, karaya gum, pectin, xanthan gum, pullulan, gellan gum, etc.), proteins (e.g. milk protein, soybean protein, etc.), and fractions thereof. Two or more of the polymer materials can be mixed together. Although dispersion stability of the protein can be attained even if the water-soluble soybean polysaccharide is not a main component in the crosslinked compound, it is desirable that the water-soluble soybean polysaccharide is incorporated in an amount of not less than the half of the crosslinked compound so as to achieve a stronger effect.

In the case of crosslinkage formation between the water-soluble soybean polysaccharide and other polymer material, such formation is carried out in a similar manner to the case using the water-soluble soybean polysaccharide alone, and it is also possible to make crosslinkages directly or via other crosslinking agent. Moreover, the reaction method and the conditions in that case are according to the case of the water-soluble soybean polysaccharide alone.

(Purification)

Although it is possible to use the resulting water-soluble soybean polysaccharide as it is, purification is desirable so as to fulfill its function. In particular, when an extracted water-soluble soybean polysaccharide is crosslinked as it is, it is preferable to remove proteins contaminated in the water-soluble soybean polysaccharide because they give an adverse effect on the water-soluble soybean polysaccharide for dispersion stability of a protein. The method for removal of the proteins includes a method where proteins are aggregated after pH adjustment and removed by a separation means such as pressure filtration-separation, centrifugation, filtration, and membrane separation; a method where proteins are degraded with an arbitrary protease; and a purification method where impurities are removed by adsorption using an activated carbon or a resin. In the case where proteins are aggregated by pH adjustment, the pH is adjusted to around the isoelectric point of soybean protein, i.e. about pH 4.5, preferably pH 3.5 to 5.0, and the precipitated proteins are separated and removed. There is no particular limitation to acids used for pH adjustment and any acids can be utilized, including inorganic acids (e.g. hydrochloric acid, sulfuric acid, phosphoric acid, etc.) and organic acids (e.g. acetic acid, citric acid, lactic acid, etc.). It is preferable to use one of these acids or combine two or more kinds of these acids for removing the proteins.

Any desalting purification methods can be used so long as they can separate and remove salts. Such purification method includes a precipitation method using a polar organic solvent (e.g. methanol, ethanol, isopropanol, acetone, etc.); an electrodialysis treatment; an ion-exchange resin or hydrophobic resin treatment; and a membrane fractionation using a UF membrane. Single method or combination use of two or more of these methods is preferred. A powdered water-soluble soybean polysaccharide can be obtained by sterilizing a solution of thus purified water-soluble soybean polysaccharide through plate sterilization or steam sterilization, and then pulverizing after freeze-drying, spray-drying, heat-drying, or the like.

(Molecular Mass)

It has been revealed that the water-soluble soybean polysaccharide obtained by the above-described method has contained a polysaccharide component with a molecular mass of 0.5 million to 10 million when analyzed by gel filtration HPLC (TSKgel-G-5000 PWXL; TOSOH 7.8 mm×30 cm). The molecular mass of the water-soluble soybean polysaccharide has been a value measured using a standard reference pullulan P-82 (Showa Denko K.K.). In this case, analysis conditions have been as follows: mobile phase, 50 mM sodium acetate solution (pH 5.0); flow rate, 1.0 ml/min; sugar has been detected with an RI detector. It has been assumed that a total peak area has been equivalent to the total mass of the polysaccharide, and the ratio of the peak area of the polysaccharide ingredient with a molecular mass of 0.5 million to 10 million to the total peak area has been calculated as a content rate of the high molecular fraction. Dispersion stability of the protein becomes effective when the content rate of the high molecular fraction of the water-soluble soybean polysaccharide obtained is 5% or more, preferably 20% or more, and more preferably 30% or more. In addition, the content rate of the high molecular fraction in the water-soluble soybean polysaccharide not exceeding 95% is preferable because the limitation of use by the viscosity etc. is few.

(Dispersion Stabilizer)

The present invention relates to a protein dispersion stabilizer which can prevent the aggregation of protein particles in an aqueous solution, and can retain a stable dispersion state. The function thereof is effective in range of pH 4.2 to 5.2, preferably pH 4.4 to 4.8, and more preferably pH 4.4 to 4.6, and is suitable for acidic protein food and beverage, particularly for acidic protein beverage. Dispersion of a milk protein in range of pH less than 4.2 can be attained with a conventional water-soluble soybean polysaccharide. The milk protein starts to dissolve in range of pH more than 5.2, therefore, it is not necessary to use a dispersing agent. By using a dispersion stabilizer comprising the water-soluble soybean polysaccharide produced by the present invention, acidic protein food and beverage can be prepared in range of pH 4.2 to 5.2.

Compared to conventionally used pectin, etc., the dispersion stabilizer of the present invention is easy to generate acidity and its flavor is good, therefore, it can be utilized for wide applications. Moreover, there is also a feature of low viscosity in the stabilizer. In order to improve physical properties of the dispersion stabilizer, various gums and proteins, and degraded products thereof can be used in combination, if necessary. Examples of the substances for combination use include, for example, polysaccharides (e.g. starch, modified starch, various celluloses, agar, carrageenan, furcellaran, guar gum, locust bean gum, tamarind seed polysaccharides, tara gum, gum arabic, tragacanth gum, karaya gum, pectin, xanthan gum, pullulan, gellan gum, etc.) as well as proteins (e.g. gelatin, etc.).

(Acidic Protein Food and Beverage)

The acidic protein food and beverage of the present invention are acidic protein food and beverage containing animal and vegetable proteins, regardless of whether the food and beverage are solid or liquid form. Examples of the animal proteins refer to mainly animal milk such as cow milk and goat milk, and specific examples include cow milk, skim milk, whole milk powder, skim milk powder, whey powder, sweetened milk, condensed milk, concentrated milk, processed milk fortified with minerals (e.g. calcium, etc.) or vitamins, and fermented milk. The vegetable proteins include soybean milk obtained mainly from soybeans, and specific examples include soybean milk, defatted soybean milk, soybean milk powder, defatted soybean milk powder, soybean protein isolate, and fermented products thereof.

The acidic protein beverage among the acidic protein food and beverage is protein beverage obtained by fermenting a beverage using animal milk, soybean milk or the like, or by adding fruit juices or organic acids (e.g. citric acid, lactic acid, etc.) or inorganic acids (e.g. phosphoric acid) to the beverage, to make the pH range acidic. Generally, there are exemplified lactic acid bacteria beverages living bacteria or sterilized, drink yogurts, kefirs, and the like. The acidic protein food among the acidic protein food and beverage includes acidic frozen dessert such as acidic ice cream and frozen yogurt obtained by adding organic acids or fruit juices to frozen dessert containing milk components such as ice cream; acidic dessert obtained by adding organic acids or fruit juices, etc. to gelled food such as pudding and bavarois; coffee beverage; acidic cream; yogurt and the like; using the above animal milk or soy milk as a raw material.

The water-soluble soybean polysaccharide produced by the present invention fulfills a function of stabilizing a dispersion of a protein, particularly in the acidic protein beverage. The water-soluble soybean polysaccharide of the present invention can stabilize the dispersion of, a protein in a pH range around the isoelectric point of the protein in which the conventional water-soluble soybean polysaccharide cannot stabilize. With respect to protein species in that case, effects can be observed in any proteins, but milk protein or soybean protein is preferable, and milk protein is the most general-purpose acidic food and beverage which shows an excellent effect of the dispersion stabilizer of the present invention and is most preferable. Although the viscosity of the acidic protein beverage in that case may vary depending on the concentrations of protein and dispersion stabilizer, an acidic protein beverage with a viscosity of 10 mPa·s or less can be prepared by using the dispersion stabilizer of the present invention in a mixing ratio of, for example, Table 1 as shown later. In addition, in the case of an acidic milk beverage with a pH of less than 4.2 in which the conventional water-soluble soybean polysaccharide was used, a lactic acid bacterium could not live. To the contrary, when a stabilizer of the present invention is used, food and beverage having a pH range at which a lactic acid bacterium can be alive can be made. Thus, a lactic acid bacterium beverage of non-heating and living bacterium can be prepared using lactic acid bacterium-fermented milk.

The protein dispersion stabilizer of the present invention is particularly effective for acidic food and beverage having a protein concentration of 10% by weight or less, and good protein dispersion stability is shown around a pH range in the vicinity of the isoelectric point of the protein by adding 0.05 to 2.0% by weight, more preferably 0.1 to 1.5% by weight, and further preferably 0.2 to 1.0% by weight of such stabilizer to the acidic food and beverage. For example, with milk protein and soybean protein, protein food and beverage having a pH of about 4.2 to 5.2 can be prepared, and it can prevent from aggregation particularly at a pH of 4.4 to 4.6. If the concentration of the dispersion stabilizer is high, there is a case to affect a flavor of food and beverage, and if the concentration of the dispersion stabilizer is low, there is a case being not able to fulfill an ability of dispersion stabilization.

EXAMPLES

Examples will be described hereinafter, but the technical thought of the present invention is not limited to these exemplifications. The "parts" throughout the Examples are all based on weight, unless otherwise specified.

Production Example 1

A 5% aqueous solution of water-soluble soybean polysaccharide (SOYAFIVE S-DA100: manufactured by Fuji Oil Co., Ltd.) was prepared and heated in a boiling water bath for 5 minutes. Sodium trimetaphosphate was dissolved in the aqueous polysaccharide solution so as to have a final concentration of 2% and the resulting solution was adjusted to pH 12 with an aqueous sodium hydroxide solution. The reaction solution was allowed to react with stirring at 60° C. for one hour. The insolubles produced were removed by centrifugation (8,000 rpm, 30 minutes) to obtain a supernatant as polysaccharides. The polysaccharide solution was precipitated with ethanol having a final concentration of 60% by weight, and purified with an aqueous ethanol solution of 90% by weight to give the precipitates, which were then air-dried to obtain a water-soluble soybean polysaccharide A.

Production Example 2

Comparison of Reaction pH

Intermolecular Polymerization of Water-Soluble Soybean Polysaccharides

Water-soluble soybean polysaccharides B, C, D, E, F, and G were obtained in a similar manner to the production procedure of water-soluble soybean polysaccharide A except that the pH was adjusted to 8, 9, 10, 11, 13, and 14, respectively, after addition of sodium trimetaphosphate in the production of water-soluble soybean polysaccharide A.

Production Example 3

Comparison of Reaction Temperatures

Intermolecular Polymerization of Water-Soluble Soybean Polysaccharides

Water-soluble soybean polysaccharides H, I, J, K, and L were obtained in a similar manner to the production procedure of water-soluble soybean polysaccharide A except that the reaction temperature was set to 40° C., 50° C., 70° C., 80° C., and 90° C., respectively, in the production of water-soluble soybean polysaccharide A.

Production Example 4

Polymerization with Other Polymer Material (1)

A 2.5% aqueous solution of water-soluble soybean polysaccharide (SOYAFIVE S-DA100) was prepared and dextrin (PINEDEX #100, manufactured by Matsutani Chemical Industry Co., Ltd.) was dissolved in the solution to a concentration of 2.5%. The resulting solution was heated in a boiling water bath for 5 minutes. Trimetaphosphoric acid was dissolved in the aqueous polysaccharide solution so as to have a final concentration of 2% and the resulting solution was adjusted to pH 12 with an aqueous sodium hydroxide solution. The reaction solution was allowed to react with stirring at 60° C. for one hour. The insolubles produced were removed by centrifugation (8,000 rpm, 30 minutes) to obtain a supernatant as polysaccharides. The polysaccharide solution was precipitated with an aqueous ethanol solution having a concentration of 60% by weight, and purified with an aqueous ethanol solution of 90% by weight to give the precipitates, which were then air-dried to obtain a water-soluble soybean polysaccharide M.

Production Example 5

Polymerization with Other Polymer Material (2)

A 2.5% aqueous solution of water-soluble soybean polysaccharide (SOYAFIVE S-DA100) was prepared and HM pectin (USP-H: manufactured by Sansho Co., Ltd.) was dissolved in the solution to a concentration of 2.5%. The resulting solution was heated in a boiling water bath for 5 minutes. Trimetaphosphoric acid was dissolved in the aqueous polysaccharide solution so as to have a final concentration of 2% and the solution was adjusted to pH 12 with an aqueous sodium hydroxide solution. The reaction solution was allowed to react with stirring at 60° C. for one hour. The insolubles produced were removed by centrifugation (8,000 rpm, 30 minutes) to obtain a supernatant as polysaccharides. The polysaccharide solution was precipitated with an aqueous ethanol solution having a concentration of 60% by weight, and purified with an aqueous ethanol solution of 90% by weight to give the precipitates, which were then air-dried to obtain a water-soluble soybean polysaccharide N.

Production Example 6

Simultaneous Reaction with Deesterification

Water was added to dry okara so as to have a 10% concentration of a solid content, and the pH before extraction was adjusted to 4.5 with hydrochloric acid. The mixture was extracted under heating at 120° C. for 90 minutes. After the extraction, the precipitates produced were removed by centrifugation (8,000 rpm, 30 minutes) to obtain a supernatant. Sodium trimetaphosphate was dissolved in the supernatant to a concentration of 2%, and the solution was adjusted to pH 12 with an aqueous sodium hydroxide solution for demethoxylation, and stirred at 60° C. for one hour. The polysaccharide solution was precipitated with an aqueous ethanol solution of 60% by weight, and purified with an aqueous ethanol solution of 90% by weight to give the precipitates, which were then air-dried to obtain a water-soluble soybean polysaccharide O.

Example 1

Measurement of Molecular Mass

Measurement of Molecular Mass Distribution and Quantification of High Molecular Fraction The molecular mass of water-soluble soybean polysaccharides was determined according to the above-described gel filtration HPLC for measurement of molecular mass distribution. Water-soluble soybean polysaccharide A and water-soluble soybean polysaccharide (SOYAFIVE S-DA100) are shown in FIG. 1. From this Figure, it was able to confirm that the water-soluble soybean polysaccharide was polymerized by crosslinking. With respect to quantification of the high molecular fraction, it was assumed that a total peak area was equivalent to the total mass of the polysaccharide, and the ratio of the peak area of the polysaccharide component with a molecular mass of 0.5 million to 10 million to the total peak area was quantified.

Example 2

Production and Stability Evaluation of Acidic Milk Beverage

Preparation of Fermented Milk

An aqueous solution containing 21% by weight of skim milk powder (manufactured by Yotsuba Co., Ltd.) was prepared and sterilized under heating at 95° C. with stirring. After cooling, commercially available plain yogurt was inoculated thereto and fermented in a constant temperature oven of 40° C. until the pH became 4.6. The fermented yogurt was homogenized with a homogenizer (150 kgf) by crushing the curd.

Preparation of Acidic Milk Beverage

Each aqueous solution of the water-soluble soybean polysaccharides A to O produced in each Production Example and Comparative Production Example, water, granulated sugar solution and fermented milk were mixed together in an ice-water bath in a mixing ratio as shown in Table 1, and the mixture was adjusted to an arbitrary pH with a 50 wt %-solution of citric acid on ice. The mixed solution was homogenized with a homogenizer (150 kgf). The solution was transferred to a glass bottle, sealed up, and sterilized under heating in a warm water bath of 80° C. for 20 minutes.

TABLE 1

| Formulation of Acidic Milk Beverage | |
|---|---|
| 2 wt %-solution of water-soluble soybean polysaccharide | 20 parts |
| Water | 52 parts |
| 50 wt %-solution of granulated sugar | 14 parts |
| 21 wt %-solution of fermented milk | 14 parts |

Evaluation of Acidic Milk Beverages

Evaluation was performed on viscosity, precipitation rate, supernatant, and further general stability of the prepared acidic milk beverages.

Viscosity: One week after the preparation, viscosity was measured with a BM-type viscometer (rotor No. 1, 60 rpm, 1 min).

Precipitation Rate: One week after the preparation, 20 g of acidic milk beverage was separated in a centrifuge tube and centrifuged using a Kokusan centrifugal separator (2,000 rpm, 20 min), and the weight of the precipitates after removal of the supernatant was measured. The precipitation rate was calculated according to the following equation:

$$\text{Precipitation Rate (\%)} = (\text{Weight of Precipitates})/(\text{Weight of Collected Acidic Milk Beverage}) \times 100$$

The precipitation rate was expressed in terms of the following criteria:

⊙: the case where the precipitation rate is less than 0.6%;

○: the case where the precipitation rate is from 0.6% to less than 1%;

Δ: the case where the precipitation rate is from 1% to less than 1.5%; and x: the case where the precipitation rate is 1.5% or more.

Supernatant: The presence or absence of aggregation after heat sterilization of the supernatant, and the presence or absence of the supernatant on the upper surface of the solution was judged visually. The symbol "+" indicated that there was a supernatant and the symbol "±" indicated that there was no supernatant.

General Evaluation: The above-described matters were summarized on each polysaccharide and evaluation was performed using the following criteria:

⊙: very good

○: good

Δ: slightly bad x: bad

TABLE 2

Stability of Acidic Milk Beverages (Comparison of Reaction pH: Water-Soluble Soybean Polysaccharides A to G)

| | Crosslinking Reaction Conditions | | Evaluation of Acidic Milk Beverages | | | | | Content (%) of High Molecular Fraction |
|---|---|---|---|---|---|---|---|---|
| | Reaction pH | Reaction Temperature | Acidic Milk pH | Viscosity (cp) | Precipitation Rate (%) | Supernatant | General Evaluation | |
| Water-Soluble Soybean Polysaccharide B | pH 8 | 60° C. | 4.2 | 4.6 | 1.15 | Δ | + | X | 0.9 |
| | | | 4.4 | 4.5 | 1.52 | Δ | + | | |
| | | | 4.6 | 4.8 | 2.83 | X | + | | |
| Water-Soluble Soybean Polysaccharide C | pH 9 | ↑ | 4.2 | 4.0 | 0.84 | ○ | ± | X | 1.1 |
| | | | 4.4 | 4.6 | 1.04 | Δ | ± | | |
| | | | 4.6 | 4.3 | 2.43 | X | + | | |
| Water-Soluble Soybean Polysaccharide D | pH 10 | ↑ | 4.2 | 4.0 | 0.73 | ○ | ± | ○ | 18.2 |
| | | | 4.4 | 4.6 | 0.94 | ○ | ± | | |
| | | | 4.6 | 4.7 | 1.03 | Δ | + | | |
| Water-Soluble Soybean Polysaccharide E | pH 11 | ↑ | 4.2 | 4.0 | 0.74 | ○ | ± | ○ | 23.5 |
| | | | 4.4 | 4.1 | 0.81 | ○ | ± | | |
| | | | 4.6 | 4.1 | 0.98 | ○ | + | | |
| Water-Soluble Soybean Polysaccharide A | pH 12 | ↑ | 4.2 | 5.5 | 0.39 | ⊙ | + | ⊙ | 38.3 |
| | | | 4.4 | 5.2 | 0.30 | ⊙ | ± | | |
| | | | 4.6 | 4.6 | 0.35 | ⊙ | ± | | |
| Water-Soluble Soybean Polysaccharide F | pH 13 | ↑ | 4.2 | 4.1 | 0.92 | ○ | ± | ⊙ | 44.1 |
| | | | 4.4 | 4.0 | 0.71 | ○ | ± | | |
| | | | 4.6 | 4.4 | 0.55 | ⊙ | + | | |
| Water-Soluble Soybean Polysaccharide G | pH 14 | ↑ | 4.2 | 4.3 | 0.90 | ○ | ± | X | 1.3 |
| | | | 4.4 | 4.5 | 1.51 | X | ± | | |
| | | | 4.6 | 4.2 | 1.74 | X | + | | |
| SOYAFIVE S-DA100 | — | — | 4.2 | 4.5 | 1.26 | Δ | + | X | 0.9 |
| | | | 4.4 | 4.5 | 1.77 | X | + | | |
| | | | 4.6 | 4.6 | 3.19 | X | + | | |
| HM-Pectin | — | — | 4.2 | 12.6 | 0.35 | ⊙ | ± | ⊙ | Not measured |
| | | | 4.4 | 15.0 | 0.45 | ⊙ | ± | | |
| | | | 4.6 | 18.0 | 0.30 | ⊙ | ± | | |

In the cases of pH 8, 9, and 14 (water-soluble soybean polysaccharides B, C, and G), an increase of the high molecular fraction was not observed in the obtained polysaccharides, indicating that a crosslinking reaction did not take place. These polysaccharides did not have stabilizing properties for acidic milk beverages. Whereas, in the cases of pH 10 to less than pH 14 (A, D to F), an increase of the high molecular fraction was recognized, and the stability of such acidic milk tended to be increased. Especially, in the cases of pH 12 to less than pH 14 (A, E), there were very few supernatant on the upper surface of the beverages, and a highly stabilizing effects. Moreover, in SOYAFIVE S-DA100 used for comparison which is the conventional water-soluble soybean polysaccharide, dispersion stability could not be achieved at a pH of 4.2 to 4.6 and although dispersion stability could be achieved with HM-pectin (USP-H, manufactured by Sansho Co., Ltd.), an acidic milk beverage having a high viscosity was produced.

TABLE 3

Stability of Acidic Milk Beverages (Comparison of Reaction Temperature: Water-Soluble Soybean Polysaccharides A, H to L)

| | Crosslinking Reaction Conditions | | Evaluation of Acidic Milk Beverages | | | | | Content (%) of High Molecular Fraction |
|---|---|---|---|---|---|---|---|---|
| | Reaction pH | Reaction Temperature | Acidic Milk pH | Viscosity (cp) | Precipitation Rate (%) | Supernatant | General Evaluation | |
| Water-Soluble Soybean Polysaccharide H | pH 12 | 40° C. | 4.2 | 5.0 | 0.86 | ○ | ± | Δ | 4.3 |
| | | | 4.4 | 4.8 | 0.82 | ○ | ± | | |
| | | | 4.6 | 3.6 | 1.06 | Δ | + | | |
| Water-Soluble Soybean Polysaccharide I | ↑ | 50° C. | 4.2 | 4.8 | 0.65 | ○ | ± | ⊙-○ | 17.2 |
| | | | 4.4 | 4.3 | 0.72 | ○ | ± | | |
| | | | 4.6 | 4.2 | 0.60 | ○ | ± | | |
| Water-Soluble Soybean Polysaccharide A | ↑ | 60° C. | 4.2 | 5.5 | 0.39 | ⊙ | + | ⊙ | 38.3 |
| | | | 4.4 | 5.2 | 0.30 | ⊙ | ± | | |
| | | | 4.6 | 4.6 | 0.35 | ⊙ | ± | | |
| Water-Soluble Soybean Polysaccharide J | ↑ | 70° C. | 4.2 | 5.5 | 0.53 | ⊙ | + | ⊙ | 30.5 |
| | | | 4.4 | 5.2 | 0.42 | ⊙ | ± | | |
| | | | 4.6 | 5.2 | 0.40 | ⊙ | ± | | |
| Water-Soluble Soybean Polysaccharide K | ↑ | 80° C. | 4.2 | 5.5 | 0.74 | ○ | ± | ⊙-○ | 21.7 |
| | | | 4.4 | 4.0 | 0.68 | ○ | ± | | |
| | | | 4.6 | 4.0 | 0.66 | ○ | ± | | |
| Water-Soluble Soybean Polysaccharide L | ↑ | 90° C. | 4.2 | 4.3 | 0.85 | ○ | ± | Δ | 1.2 |
| | | | 4.4 | 4.8 | 0.95 | ○ | ± | | |
| | | | 4.6 | 4.6 | 1.02 | Δ | ± | | |

Only a slight increase of the high molecular fraction was observed in the cases (H, L) of 40° C. and 90° C., and stability of the acidic milk beverages at pH 4.6 became slightly bad, however, high stability of the beverages was shown in the range from 50° C. or more to 80° C. or less (A, I to K), and especially, such stability was further improved in the range from 60° C. or more to 70° C. or less (A, J).

the both ends. Therefore, the mass peak of 365 was considered to be derived from a structure that the phosphoric acid residue was positioned at the central site and arabinose residues were linked to the both ends, and it was supposed that the water-soluble soybean polysaccharide A had a phosphoric acid diester structure wherein sugar chains were crosslinked via the phosphoric acid residues.

TABLE 4

Stability of Acidic Milk Beverages (Water-Soluble Soybean Polysaccharides M to O)

| | Crosslinking Reaction Conditions | | Evaluation of Acidic Milk Beverages | | | | | Content (%) of |
| --- | --- | --- | --- | --- | --- | --- | --- | --- |
| | Reaction pH | Reaction Temperature | Acidic Milk pH | Viscosity (cp) | Precipitation Rate (%) | Supernatant | General Evaluation | High Molecular Fraction |
| Water-Soluble Polysaccharide M | pH 12 | 60° C. | 4.2 | 5.0 | 1.00 | Δ | ± | ○ | 27.5 |
| | | | 4.4 | 5.0 | 0.85 | ○ | ± | | |
| | | | 4.6 | 4.9 | 0.70 | ○ | ± | | |
| Water-Soluble Polysaccharide N | ↑ | ↑ | 4.2 | 5.2 | 0.90 | ○ | ± | ○ | 24.4 |
| | | | 4.4 | 5.5 | 0.70 | ○ | ± | | |
| | | | 4.6 | 5.0 | 0.70 | ○ | ± | | |
| Water-Soluble Soybean Polysaccharide O | ↑ | ↑ | 4.2 | 5.4 | 1.00 | Δ | ± | ⊙ | 43.6 |
| | | | 4.4 | 5.4 | 0.60 | ⊙ | ± | | |
| | | | 4.6 | 5.5 | 0.55 | ⊙ | ± | | |

Stability of the acidic milk beverages was improved with the water-soluble polysaccharides which had been crosslinked with dextrin, starch, or pectin, respectively, i.e. both of water-soluble polysaccharides M and N. In addition, the water-soluble soybean polysaccharide O which had been treated by simultaneous deesterification showed a very high stability to the beverages.

When the content of the high molecular fraction with a molecular mass of 0.5 million to 10 million and stability of acidic milk were compared, the stability of acidic milk beverage tended to become higher if the content of such high molecular fraction became higher. Strong stability for a protein was recognized in the water-soluble soybean polysaccharides A, D to F, I to K, and M to O in which the high molecular fraction content was exceeding 5%, and remarkably strong stability for a protein was recognized in the water-soluble soybean polysaccharides A, F, J, and O in which the high molecular fraction content was exceeding 30%.

Example 3

Confirmation of Crosslinking Structure

Water-soluble soybean polysaccharide A was degraded with Pectinex Ultra SP-L (manufactured by Novozymes A/S Co.) and served as a sample for mass spectrometry. MALDI-TOF-MS analysis and MS/MS analysis were carried out on the water-soluble soybean polysaccharide degraded by the enzyme (FIGS. 2 and 3).

A mass peak of 365 derived from the bonding of a phosphoric acid residue and two molecules of arabinose was confirmed by MALDI-TOF-MS analysis (FIG. 2). In order to confirm the order of bonding, an MS/MS analysis was further carried out. Since the peak derived from the arabinose was not observed (FIG. 3) though the glycoside bond is broken by MS/MS analysis due to its comparatively weak bonding force, it was thought that there was no structure wherein a phosphoric acid residue was linked to the end of the glycoside bond formed from two arabinose molecules, but there was only a structure wherein the phosphoric acid residue was positioned at the central site and the arabinose was linked at Example 4

Preparation of Acidic Dessert 5 parts of sugar, 0.5 part of carrageenan, and 0.1 part of locust bean gum were dissolved in 30 parts of warmed water (Solution A). 5 parts of the water-soluble soybean polysaccharide A prepared in Production Example 1 were added to 95 parts of warmed water, and the mixture was dissolved by stirring at 80° C. for 10 minutes, and then cooled to 20° C. (Solution B). 40 parts of lactic acid bacteria beverage (non-fat milk solid content 3.6%, pH4.5), 35.6 parts of Solution A and 10 parts of Solution B were mixed together, and 0.1 part of a yogurt flavor was added to the mixture, then water was further added to make up the total volume to 100 parts. The mixture was heated to 75° C. and homogenized with a homogenizer (150 kgf). The homogenized solution was filled into a cup container, immersed in cold water to form a jelly, which was stored in a refrigerator for one week. The resulting jelly was a jelly being free from protein aggregation and syneresis phenomenon at the stage during treatment and after storage, and having a refreshing acidity.

Example 5

Preparation of Fermented Soybean Milk Beverage 11 wt % solution of defatted soybean milk which was extracted from defatted soybean was sterilized and a starter was added. Fermentation was carried out until the pH went down to 4.5. 40 parts of the resulting fermented solution of soybean milk were mixed with 35.6 parts of the Solution A and 10 parts of the Solution B, and water was further added to make up the total volume to 100 parts. The mixture was heated to 75° C. and homogenized with a homogenizer (150 kgf) to prepare a fermented soybean milk beverage. The beverage obtained had a refreshing acidity, and being free from protein aggregation at the stage during treatment and after storage.

Figure 1:
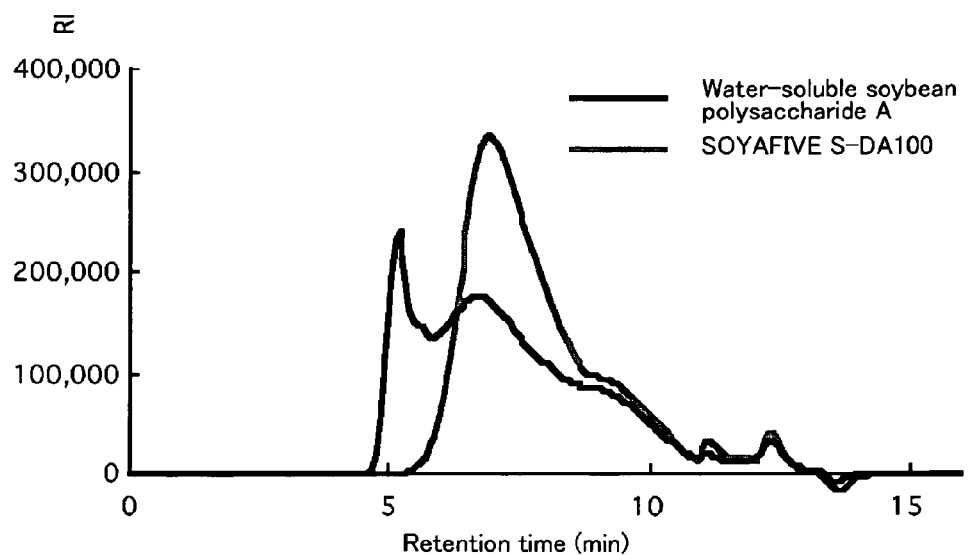
FIG. 1 is a chromatogram of HPLC gel filtration of water-soluble soybean polysaccharide A and water-soluble soybean polysaccharide (SOYAFIVE S-DA100).
Figure 2:
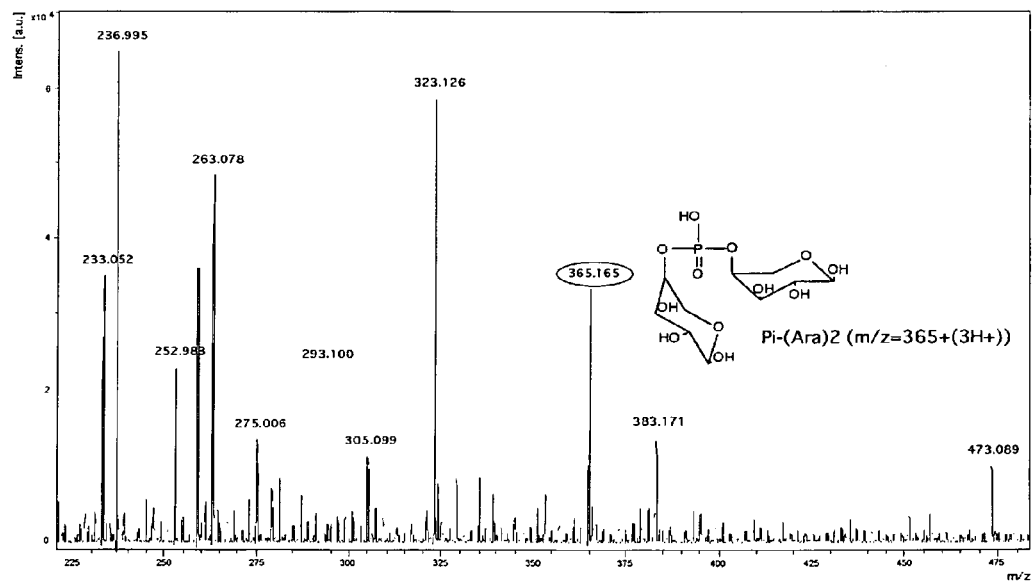
FIG. 2 is a chart where a water-soluble soybean polysaccharide which has been degraded with an enzyme is analyzed by MALDI-TOF-MS.
Figure 3:
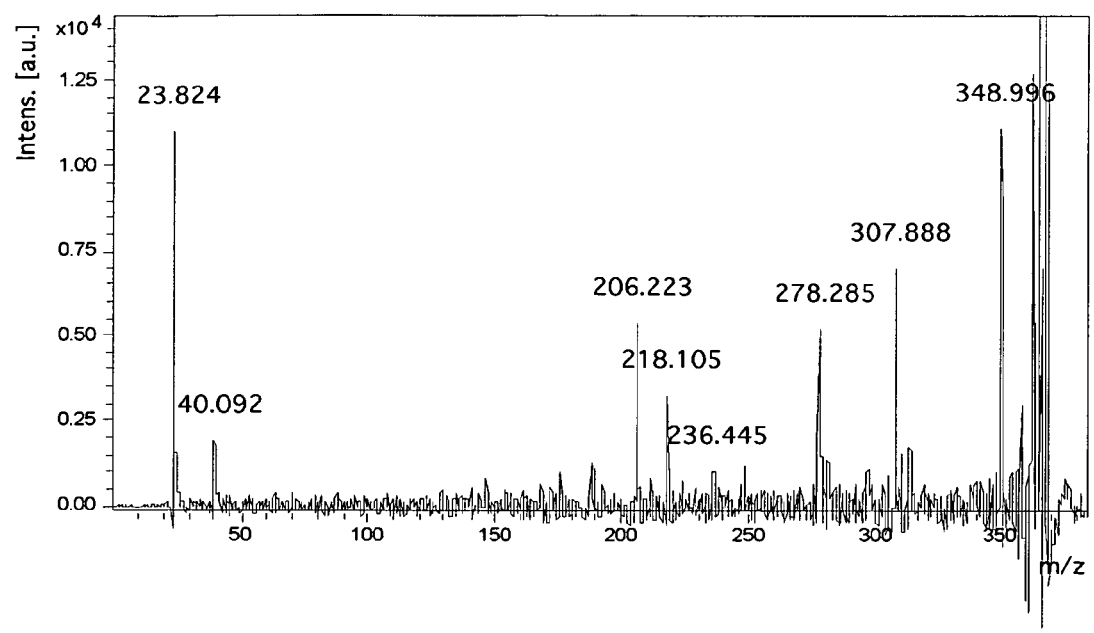
FIG. 3 is a chart where the sample of FIG. 2 is further analyzed by MS/MS.

The invention claimed is:

1. A method for producing a crosslinked water-soluble polysaccharide, which comprises carrying out a crosslinking treatment of a water-soluble soybean polysaccharide by adding a trimetaphosphoric acid or salt thereof as a crosslinking agent to an aqueous solution of the water-soluble soybean polysaccharide, followed by a heating treatment under alkali conditions, wherein the alkali condition is pH 10 or more.

2. The method for producing a crosslinked water-soluble polysaccharide according to claim 1, wherein the alkali condition is pH 10 or more and less than pH 14.

3. The method for producing a crosslinked water-soluble polysaccharide according to claim 1, wherein the alkali condition is pH 12 or more and pH 13 or less.

4. The method for producing a crosslinked water-soluble polysaccharide according to claim 2, wherein a heating condition of the heating treatment is 40° C. or higher and 90° C. or lower.

5. The method for producing a crosslinked water-soluble polysaccharide according to claim 2, wherein a heating condition of the heating treatment is 50° C. or higher and 80° C. or lower.

6. The method for producing a crosslinked water-soluble polysaccharide according to claim 3, wherein a heating condition of the heating treatment is 50° C. or higher and 80° C. or lower.

7. A dispersion stabilizer for a protein comprising a crosslinked water-soluble soybean polysaccharide as an active ingredient, wherein the crosslinked water-soluble soybean comprises an intermolecular crosslinkage of water-soluble soybean of saccharides via a phosphoric acid diester bond.

8. An acidic protein food or beverage comprising the dispersion stabilizer according to claim 7.

9. The dispersion stabilizer for a protein according to claim 7, wherein the phosphoric acid diester bond is linked to arabinose residues at both ends.

10. A crosslinked water-soluble soybean polysaccharide comprising an intermolecular crosslinkage of water-soluble soybean polysaccharides via a phosphoric acid diester bond.

11. A crosslinked water-soluble soybean polysaccharide according to claim 10, wherein the phosphoric acid diester bond is linked to arabinose residues at both ends.

12. A crosslinked water-soluble soybean polysaccharide comprising crosslinkage of a water-soluble soybean polysaccharide and other polymer material via a phosphoric acid diester bond.

* * * * *